US011449611B2

(12) United States Patent
Schat (10) Patent No.: US 11,449,611 B2
(45) Date of Patent: Sep. 20, 2022

(54) APPARATUSES AND METHODS INVOLVING A CIRCUIT FOR DETECTING A HARDWARE-TROJAN (71) Applicant: NXP B.V., Eindhoven (NL)

(72) Inventor: Jan-Peter Schat, Hamburg (DE)

(73) Assignee: NXP B.V., Eindhoven (NL)

( * ) Notice: Subject to any disclaimer, the term of this patent is extended or adjusted under 35 U.S.C. 154(b) by 479 days.

(21) Appl. No.: 16/417,821

(22) Filed: May 21, 2019

(65) Prior Publication Data
US 2020/0372152 A1 Nov. 26, 2020

(51) Int. Cl.
*G06F 21/56* (2013.01)
*G06N 20/00* (2019.01)
*G06F 21/71* (2013.01)

(52) U.S. Cl.
CPC .......... *G06F 21/566* (2013.01); *G06F 21/567* (2013.01); *G06F 21/71* (2013.01); *G06N 20/00* (2019.01); *G06F 2221/034* (2013.01)

(58) Field of Classification Search
CPC .......................... G06F 2221/034; G06N 20/00
See application file for complete search history.

(56) References Cited

U.S. PATENT DOCUMENTS

| 8,635,117 | B1 | 1/2014 | Acuna-Rohter |
| 9,268,938 | B1* | 2/2016 | Aguayo Gonzalez . G01R 21/00 |
| 11,023,623 | B2 | 6/2021 | Schat |
| 2005/0122965 | A1 | 6/2005 | Heinla et al. |
| 2011/0047044 | A1 | 2/2011 | Wright et al. |
| 2014/0283147 | A1* | 9/2014 | Tehranipoor ............ G06F 21/70 726/34 |
| 2016/0098558 | A1* | 4/2016 | Vedula ..................... G06F 21/71 726/23 |
| 2016/0371485 | A1* | 12/2016 | Onabajo ................. G06F 21/552 |
| 2017/0213026 | A1* | 7/2017 | Wu .......................... G06F 21/76 |
| 2018/0032760 | A1* | 2/2018 | Hu .......................... G06F 21/556 |
| 2018/0204002 | A1 | 7/2018 | Khorrami et al. |
| 2019/0347416 | A1* | 11/2019 | Lacaze .................. G01R 31/002 |
| 2019/0347417 | A1* | 11/2019 | Tehranipoor .......... G06F 21/568 |

(Continued)

FOREIGN PATENT DOCUMENTS

CN 108846283 A 11/2018

OTHER PUBLICATIONS

Liu et al. "Hardware Trojan Detection through Golden Chip-Free Statistical Side-Channel Fingerprinting", 2014, pp. 1-6, DAC'14 Proceedings of the 51st Annual Design Automation Conference (Year: 2014).*

(Continued)

*Primary Examiner* — Hee K Song (57) ABSTRACT

An apparatus includes integrated circuitry (IC) and a further circuit. The IC includes internal circuits having sensitive/ secret data (SSD) to be maintained as confidential relative to a suspect Hardware Trojan (HT) and including access ports through which information associated with the internal circuits is accessible by external circuitry associated with the HT. The further circuit to learn behavior of the internal circuits that is unique to the integrated circuitry under different operating conditions involving the internal circuits, involving the SSD and involving other data that is functionally associated with an application of the integrated circuitry.

20 Claims, 9 Drawing Sheets (56) References Cited

U.S. PATENT DOCUMENTS

2020/0104485 A1* 4/2020 Crouch .................. G06F 21/55

OTHER PUBLICATIONS

"Stego Scrubbing—A New Direction for Image Steganography," Ira S. Moskowitz; Patricia A. Lafferty; Farid Ahmed, 2007 IEEE SMC Information Assurance and Security Workshop, pp. 119-126.

"Implementation-of-a-PUF-circuit-on-a-FPGA," Mehmet Soybali, Bema Ors, Gokay Saldamli, IEEE (2011).

Zheng Gong, Marc X. Makkes, "Hardware Trojan Side-Channels Based on Physical Unclonable Functions," IFIP Int'l Federation for Information Processing, pp. 294-303 (2011).

M. M. Farag, L. W. Lerner and C. D. Patterson, "Interacting with Hardware Trojans over a network," 2012 IEEE International Symposium on Hardware-Oriented Security and Trust, San Francisco, CA, 2012, pp. 69-74.

Mingze Gao, Khai Lai, Jiliang Zhang, Gang Qu, Aijiao Cui, Qiang Zhou, "Reliable and Anti-Cloning PDFs based on Configurable Ring Oscillators," 2015 14th Int'l Conference on Computer-Aided Design and Computer Graphics, pp. 194-201.

Indraneel Mukhopadhyay; Kirit Sankar Gupta; Diptarshi Sen; Piyali Gupta, "Heuristic Intrusion Detection and Prevention System," 2015 International Conference and Workshop on Computing and Communication (IEMCON), pp. 1-7.

"Covert Communication Using Port Knocking," Mariam Khader, Ali Hadi, Amjad Hudaib, Cybersecurity and Cyberforensics Conference, pp. 22-27 (2016).

"Steganalysis of LSB matching using characteristic function moment of pixel differences," Xianyi Chen; Guangyong Gao; Dandan Liu; Zhihua Xia, China Communications Year: 2016, vol. 13, Issue: 7, pp. 66-73.

"Towards a Reliable Detection of Covert Timing Channels over Real-Time Network Traffic," Fahimeh Rezaei, Michael Hempel, and Hamid Sharif, IEEE Transactions on dependable and secure computing, vol. 14, No. 3, pp. 249-264 (May/Jun. 2017).

"Deep Learning Hierarchical Representations for Image Steganalysis," Jian Ye, Jiangqun Ni, Yang Yi, IEEE Transactions on Information Forensics and Security, vol. 12, No. 11, Nov. 2017, pp. 2545-2557.

"Optimized Feature Extraction for Learning-based Image Steganalysis," Ying Wang, Pierre Moulin, IEEE Transactions on Information Forensics and Security, vol. 2, No. 1, Mar. 2017, pp. 31-45.

* cited by examiner

APPARATUSES AND METHODS INVOLVING A CIRCUIT FOR DETECTING A HARDWARE-TROJAN

OVERVIEW

Aspects of various embodiments are directed to apparatuses and methods involving a circuit for learning behavior associated with detecting Hardware Trojans.

Many integrated circuits (ICs) contain secret information, either for authentication (e.g., private keys, passwords), or personal information like driving profiles. Hardware Trojans (HT) may transmit such information, sometimes referred to as "leaking", to unauthorized attackers, which may cause financial and confidence losses. In this regard, an HT refers to or includes a malicious modification of a circuit, such by modifying data and/or programmed operation of integrated circuitry. Auditors and customers may request for documented countermeasures against HTs.

HTs may leak the secret data either via regular channels, where the leaked data might be hidden using steganography and hence passing input/output (I/O) channel control, or via side channels (also known as covert channels) and hence bypassing I/O channel control. HTs may use delayed activation, so that they become active only after some time of deployment in the field, thus escaping detection during verification, validation and production test.

These and other matters have presented challenges to efficiencies of HT-based learned behavior circuit implementations, for a variety of applications.

SUMMARY

Various example embodiments are directed to issues such as those addressed above and/or others which may become apparent from the following disclosure concerning a circuit for learning internal circuit behavior associated with detecting Hardware Trojans (HT).

In certain example embodiments, aspects of the present disclosure involve a circuit that learns behavior of internal circuits that is unique to the integrated circuitry (IC) under different operating conditions and for on-line detection of HTs.

In a more specific example embodiment, an apparatus includes an IC and a further circuit. The IC includes internal circuits having sensitive/secret data (SSD) to be maintained as confidential relative to a suspected HT and including access ports through which information associated with the internal circuits is accessible by external circuitry associated with the HT. The further circuit learns behavior of the internal circuits that is unique to the IC under different operating conditions involving the internal circuits, involving the SSD and involving other data that is functionally associated with an application of the IC. The behavior of the internal circuits is learned by the further circuit by observing regular channels of the internal circuits and side channels of the internal circuits.

The apparatus further includes a learning-center memory at which the further circuit stores data and instructions for executing a correlation process, sometimes herein referred to as "correlation instructions". The stored data being from which the learned behavior of the internal circuits is developed. For example, the further circuit includes the learning-center memory and the correlation instructions to develop the learned behavior of the internal circuits, and to assess and correlate statistics involving operation of the internal circuits under the different operating conditions. The learned behavior of the internal circuits is developed by changing or adapting logical operations used to trigger monitoring or recordation events based on a statistic property or an irregularity associated with the internal circuits. Additionally, the further circuit may determine probability distributions of: least significant bits (LSB) and second LSB; time intervals between two access to external ports; differences in addresses of memory accesses; and difference in data read or written.

The further circuit in specific aspects includes a heuristics-operative circuit. For example, the circuit may further include or store instructions for executing a deep learning process, sometimes herein referred to as "deep learning instructions". In various more-specific embodiments which build on the above features, the behavior is learned by modifying input data to the internal circuits. For example, the different operating conditions include accessing the internal circuits using one or more altered versions of the SSD and/or other data. As a specific example, the further circuit uses deep learning instructions for providing feedback data to modify the SSD and the other data that is functionally associated with the application of the IC. More specifically, the further circuit may use the provided feedback data to learn further behavior of the internal circuits and therefrom to develop heuristics-based operations.

In a number of related embodiments, the further circuit detects a suspect HT attempting to transmit information via the ports (e.g., regular channels). A suspect HT may be detected as attempting to transmit information via the ports associated with manipulation of timing or control bus' address and control lines for access of the memory. The further circuit is to detect the suspect HT attempting to transmit information from the IC via the internal circuits.

Other specific example embodiments are directed to a non-transitory computer-readable storage medium for use in an IC including internal circuits having SSD and including access ports through information associated with the internal circuits is accessible by external circuitry associated with a HT. The non-transitory computer-readable storage medium includes instructions that when executed cause a processor of a computing apparatus to: cause a heuristics-operative circuit to learn behavior of the internal circuits, the behavior being unique to the IC under different operating conditions involving: the internal circuits, the SSD, and other data that is functionally associated with an application of the IC; and use the behavior learned by the heuristics-operative circuit to detect or block a suspect HT from accessing the IC.

The instructions are executable to cause such a processor circuitry to modify the SSD and other data and, in response, observe regular channels of the internal circuits for regular channel data and side channels of the internal circuits for side channel data. For example, the instructions are executed to observe regular channels of the internal circuits for regular channel data and side channels of the internal circuits for side channel data, correlate modified SSD with the regular channel data and the side channel data, and provide a message in response to the correlation exceeding a threshold. The processor further isolates the modified SSD and resulting regular channel data from circuitry of the apparatus that operates on the regular channel data, such as via a sandbox environment.

The instructions may be used to detect the suspect HT. For example, the instructions are executed to further cause the processor to observe SSD with regular channel data and side channel data, correlate modified SSD with regular channel data and side channel data and in response to correlation exceeding a threshold, provide an indication of detection of a suspect HT attempting to transmit information. In other examples, the instructions are executed to further cause the processor to correlate modified SSD and other data with regular channel data and side channel data, and in response to correlation exceeding a threshold, provide an indication of detection of a suspect HT attempting to transmit information. In specific aspects, the instructions are executed to observe SSD with regular channel data and side channel data, cause the heuristics-operative circuit to learn behavior of the internal circuits using deep learning instructions, and determine thresholds for respective learned behaviors. The instructions to cause the heuristics-operative circuit to learn behavior of the internal circuits are executed to further cause the processor to determine probability distributions of: least significant bits (LSB) and second LSB; time intervals between two access to external ports; differences in addresses of memory accesses; and difference in data read or written. And, the instructions are executed to vary a supply voltage in response to detecting the suspect HT and assessing the resulting effect on the suspect HT.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a Hardware Trojan (HT)-based mechanism to learn behavior of internal circuits for detecting HTs using a circuit. In certain implementations, aspects of the present disclosure have been shown to be beneficial when used in the context of a heuristics-operative circuit that learns behavior of internal circuits that is unique to a specific integrated circuitry (IC) for online detection of a suspect HT. In some embodiments, the suspect HT is detected and blocked from accessing the IC. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment may be combined with features of another figure or embodiment even though the combination is not explicitly shown or explicitly described as a combination.

Detecting leaking of secret data, herein referred to as "sensitive/secrete data," and preventing or mitigating the leaking of the sensitive/secrete data (SSD), by HTs provides protection to the IC. As ICs contain many different types of SSD, there are different types of HTs, and different leakage and delay or trigger techniques employed by the different types of HTs, a variety of techniques may be used for triggering and detecting HTs. Embodiments in accordance with the present disclosure are directed to a circuit that may protect against a multitude of different combinations of SSD, HT types, channels for leaking, and delay or trigger mechanisms using a variety of "defense lines". The circuit may be used to estimate the leakage detection coverage, for functional safety. The multiple lines of defense includes a first defense line including secure procurement of trusted hardware intellectual property (IP), secure layout centers, certified tools for layout and verification, secure fabs, and detailed hardware source code review. Additional one or more lines of defense may be employed that includes detection of a suspect HT using behavior analysis, without knowledge or assumptions of the HT. The detection is based on the different behavior under different conditions concerning both the SSD to be kept confidential, and the functional data to be used in the application, sometimes referred to herein as "application data". Other additional lines of defense may include use of a sandbox environment to temporarily modify certain input data of those modules in which HTs may be relevant, such as temporary modification of SSD and correlation to regular and side channels, using the sandbox environment, and temporary modification of typical trigger conditions.

In specific examples, multiple lines of defenses against HTs are used. The multiple lines of detection defenses include a statistic based evaluation of correlation properties for detecting steganographic leaking of SSD based on, e.g., statistics of the least significant bit (LSB) and the second LSB, observation of SSD and application data and correlation to output data, modification of SSD and/or application data and correlation to output data with processing done in a sandbox environment, and varying the supply voltage to modify Physically Unclonable Functions (PUFs)-values and assesses the resulting effect on a suspect HT. As a specific example, many HTs are reported to use PUFs, for different purposes. One purpose is when the leaked information of different ICs is transmitted via a network to the attacker, to be able to associate different data streams to different ICs. Another purpose is hiding the existence of HTs due to application of different PUF in encrypting the data stream. PUFs may be supply-voltage sensitive. To allow for detection of HTs using a PUF, the circuit modifies the supply voltage using the trim input of low dropout regulators (LDOs), such that the supply voltage is still within the limits of the digital corelib cells, but a PUF may be disturbed. In addition, the circuit may be used to combine the detection of steganographic or regular channels and side channel attacks. Embodiments in accordance with the present disclosure combine supervision of regular input/output (I/O) channels with supervision of side channels for suspicious activities, in the course of system validation.

Performing both steganographic analysis on regular I/O channels and side channel analysis concurrently may be advantageous for a variety of reasons. There are a number of different steganography encoding methods to consider on the one hand, and the number of different covert channel methods to consider on the other hand, both having the same order of magnitude—around 10-50. Both steganography and side channel attackers may use an HT method that is new and/or uncommon such that the risk it is covered by the standard portfolio of detection is low enough (this sets a lower limit to the number of attack scenarios). Both steganography and side channel attackers may invest a lot of money to implement their attack, and want to maximize the chance that it works—hence they do not want to be surprised by shortcomings due to immaturity of the mechanism. The HTs may use a method that is proven and mature (this sets the high limit to the number of attack scenarios). Additionally, both steganographic and side channel detection may profit by using a protected environment for the hardware module that may be affected by HTs, sometimes referred to as a sandbox environment. And, both steganography and side channel attackers may use data encryption by the HT, and may use a HT that is triggered after some delay in the field, and hence the sandbox needs to make sure not only application and/or SSD are modified temporarily, but also potential (delayed) triggers are activated.

As described above, example apparatuses in accordance with the present disclosure may perform both steganographic and side channel detection for the variety for different types of HTs and/or attack scenarios. Some example steganography attack/detection scenarios include LSB matching, image or audio-specific attacks, e.g., using wavelet transform, checksum violation (deliberately changing bits in a data stream of a redundant, error-tolerant code so that the introduced bit error is corrected), and analysis based on moments of the Probability Density Function (PDF) or the Characteristic Function (CF). Example side channel attack scenarios include and/or are based on the timing of memory read or write access, the timing of transmitting or requesting a certain message, based on freely selectable bits in the header of certain transmission protocols, based on "port knocking," e.g., requesting access to certain ports that is not required by the application.

A specific example apparatus in accordance with various embodiments includes an IC and a further circuit. The IC includes internal circuits having SSD to be maintained as confidential relative to a suspect HT and including access ports through which information associated with the internal circuits is accessible by external circuitry associated with the HT. The further circuit, which may be a heuristics-operative circuit, learns behavior of the internal circuits that is unique to the IC under different operating conditions involving the internal circuits, the SSD and other data that is functionally associated with an application of the IC. The behavior of the internal circuits is learned by the further circuit by observing regular channels of the internal circuits and side channels of the internal circuits.

In other related example embodiments, the apparatus further includes a learning-center memory at which the further circuit stores data from which the learned behavior of the internal circuits is developed and stores instructions for executing or otherwise associated with a correlation process, sometimes herein referred to as "correlation instructions". The further circuit may include the learning-center memory and the correlation instructions to develop the learned behavior of the internal circuits, and to assess and correlate statistics involving operation of the internal circuits under different operating conditions. The learned behavior of the internal circuits is developed by changing or adapting logical operations used to trigger monitoring or recordation events based on a statistic property or an irregularity associated with the internal circuits.

In various embodiments, the behavior is learned by modifying input data to the internal circuits, such as by using one or more altered versions of the SSD and/or other data. As a specific example, the further circuit stores instructions for executing a deep learning process, sometimes herein referred to as "deep learning instructions". The further circuit uses deep learning instructions for providing feedback data to modify the SSD and the other data that is functionally associated with the application of the IC. The further circuit uses the provided feedback data to learn further behavior of the internal circuits and therefrom to develop heuristics-based operations.

In a number of related embodiments, the further circuit detects a suspect HT attempting to transmit information via the ports (e.g., regular channels). The detection may include detecting a suspect HT attempting to transmit information via the ports associated with manipulation of timing or of address and/or control lines for access of the memory.

Other example embodiments are directed to a non-transitory computer-readable storage medium for use in an IC including internal circuits having SSD and including access ports through information associated with the internal circuits is accessible by external circuitry associated with a HT, as further described herein.

Figure 1:
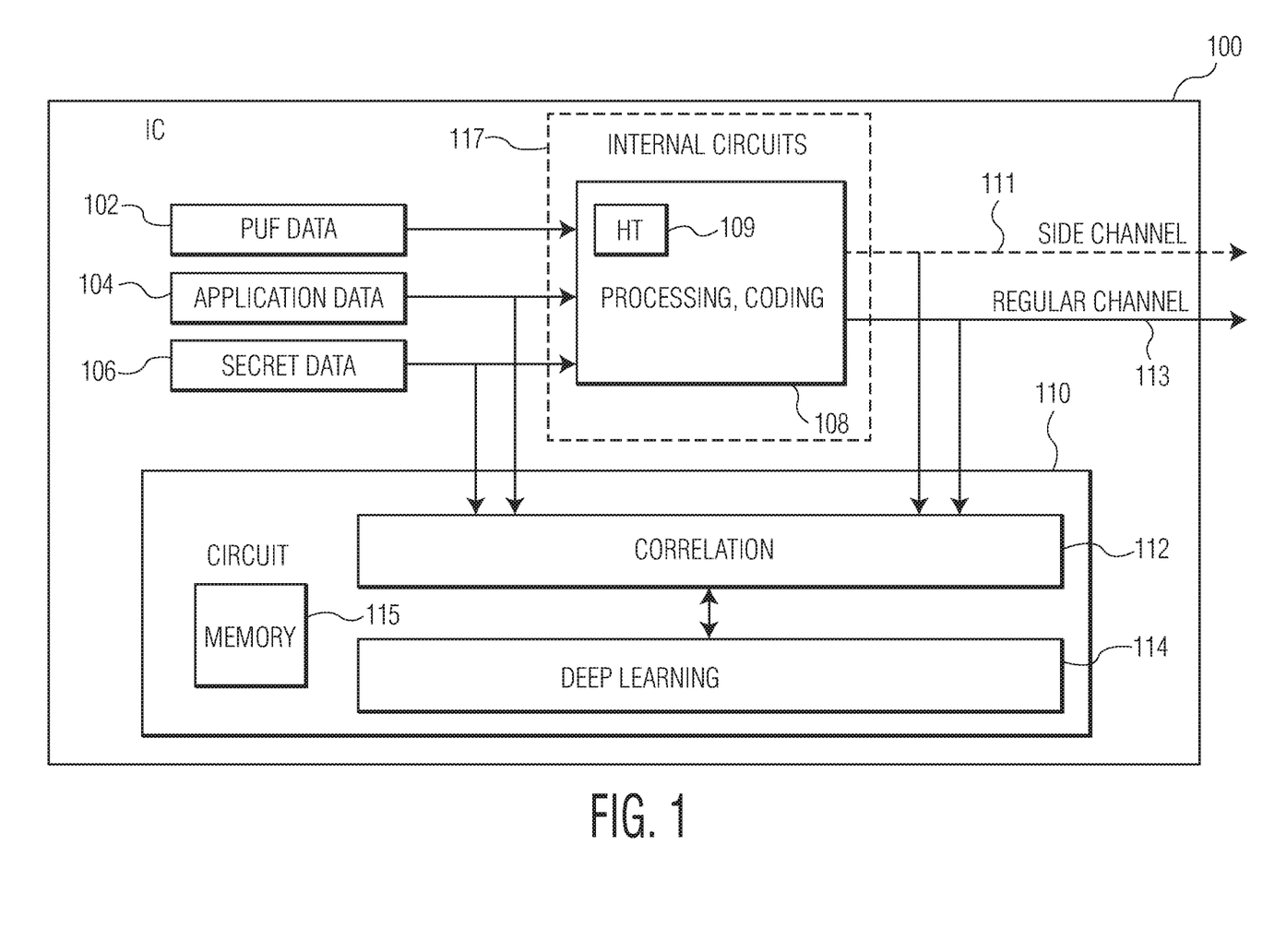
FIG. 1 is an example apparatus including a circuit, in accordance with the present disclosure.

Turning now to the figures, FIG. 1 is an example apparatus including a heuristics-operative circuit, in accordance with the present disclosure. As shown, the apparatus includes an IC 100 that has internal circuits 117 that perform processing or encoding 108 involving SSD 106 that is to be maintained as confidential relative to a suspect HT 109. In some embodiments, the internal circuits 117 includes circuitry such as one more processor, memories (including volatile and/or nonvolatile) registers, logic, sensors etc.

The IC 100 has access ports through which information associated with the internal circuits 117 is accessible by the external circuitry associated with the HT 109. The access ports may include the regular channel(s) 113 and the side channel(s) 111. Although only a single regular channel and side channel is illustrated by FIG. 1, the IC may include multiple regular channels and/or side channels. The internal circuits 117 provide processing and/or encoding 108 of input data and resulting in output data. The input data includes the SSD 106, the PUF data 102 and/or application data 104 which is processed to provide output data via the regular channel 113, sometimes herein referred to as "output channel data." The application data 104 may include data that is functionally associated with an application of the IC 100.

The apparatus further includes a further circuit 110 that learns behavior of the internal circuits 117 that is unique to the IC 100 under different operating conditions involving the IC 100, the SSD 106 and the application data 104. In specific embodiments, the further circuit 110 is a heuristics-operative circuit that learns the behavior using heuristics techniques. The behavior is learned by observing the regular channel(s) 113 and side channel(s) 111 of the internal circuits 117 over a threshold period of time. The further circuit 110 causes the different operating conditions by changing or adapting logical operations used to trigger monitoring or recordation events based on a statistic property or irregularity associated with the internal circuits 117 and observing the resulting processing and/or encoding 108.

The apparatus and/or the further circuit 110 may include a learning-center memory 115 at which the heuristics-operative circuit 110 stores data from which the learned behavior of the internal circuits 117 is developed and the correlation instructions 112. The learning-center memory 115 may further store deep learning instructions 114. The further circuit 110 develops the learned behavior of the internal circuits 117 using the correlation instructions 112, and assesses and correlates statistics involving operation of the internal circuits 117 under different operating conditions, including identifying a correlation between the input data of the internal circuits 117 to the output data. The further circuit 110 may use the deep learning instructions 114 to provide feedback data, as further described herein. The further circuit 110 uses the provided feedback data to learn further behavior of the internal circuits 117 and therefrom to develop heuristics-based operations. Execution of the deep learning instructions 114 may include or result in creation of different histograms used to learn the behavior and determine thresholds for the respective behaviors.

The further circuit 110 stores data at the learning-center memory 115 from which the learned behavior of the internal circuits 117 is developed by changing or adapting logical operations used to trigger monitoring or recordation events based on a statistic property or an irregularity associated with the internal circuits 117. The further circuit 110, based on the learned behavior, may detect a suspect HT 109 attempting to leak information via the ports, such as the regular channel(s) 113 and/or the side channel(s) 111. The suspect HT 109 may be detected as attempting to transmit information from the IC 100 via the internal circuits 117 and/or the port. The attempt may be associated with manipulation of timing for access of the memory, such as timing of bus' address and control lines.

The behavior analysis may be based on statistics, considering unknown features. In general, due to the statistical nature of the analysis, the more features that are considered, the higher the false alert rate is. Given an approximate number of 10-50 different attack scenarios both for steganography and for side channels, below a threshold false alert rate per scenario is acceptable; hence a large number of data is observed before issuing a warning of a potential HT. The principle of behavioral analysis based on observation is shown in FIG. 1. A correlation between the input data to the output data (e.g., regular channel 113 and side channel 111) of the process or module 108 associated with the internal circuits 117 that may be affected by a HT 109 is performed by the further circuit 110. The further circuit 110 gathers statistics related to timing of data accesses, read/write special address, which may reveal SSD 106, read data this is not used for further processing or storage, data written to memory, and information written to the control bus (e.g., timing and address). The statistics are used to learn or identify a degree of confidence of a suspect HT 109 being present.

In various embodiments, detecting a HT 109 and/or varying the operation of the IC may include modifying the PUF data 102 using the supply voltage. The supply voltage may be modified, using the trim input of LDOs, and the output data and/or ports are observed in response thereto, such as by accessing a register in the random-access memory (RAM) of the IC 100. As may be appreciated, the PUF data 102 (e.g., pattern of 1 and 0's and/or unique key) is the same or at least nearly the same under the same supply voltage, and varies in response to changes to the supply voltage. The supply voltage is varied to still be within the limits of the digital corelib cells. This effectively creates a cloned PUF for use by the HT 109, with the RAM being the same (e.g., same flip) and the PUF data 102 not being the same. The supply voltage is within the allowable range of the digital module but sufficient to create variability of the PUF data 102 (e.g., pattern) from the module.

In various embodiments, the correlation is performed by further using the deep learning process (e.g., executing the deep learning instructions 114) supported by a learning phase that covers a plurality of input data, system settings, and possible HT models for detecting HTs. The observation may be based on modification of the input data and observation, with the modified input data and processed output data being in a sandbox environment that protects or isolates circuitry that receives its input data from erroneous output data. In such embodiments, as further described herein, the different operating conditions may include accessing the internal circuits 117 using one or more altered versions of input data, including altered versions of the SSD 106 and/or the application data 104. In this regard, a sandbox environment refers to or includes a computer module (e.g., computer instructions and/or data, such as the modified input data and output data response to the modified input data) and/or memory or other circuitry being isolated from other application-specific circuit operations. The apparatus, via the further circuit 110, provides the sandbox environment associated with the processing and/or coding 108 of the internal circuits 117 such that the altered versions of the SSD 106 and/or application data 104 do not impact later components of the IC 100, such as the circuitry that operates on the output data of the internal circuits 117.

Figure 2:
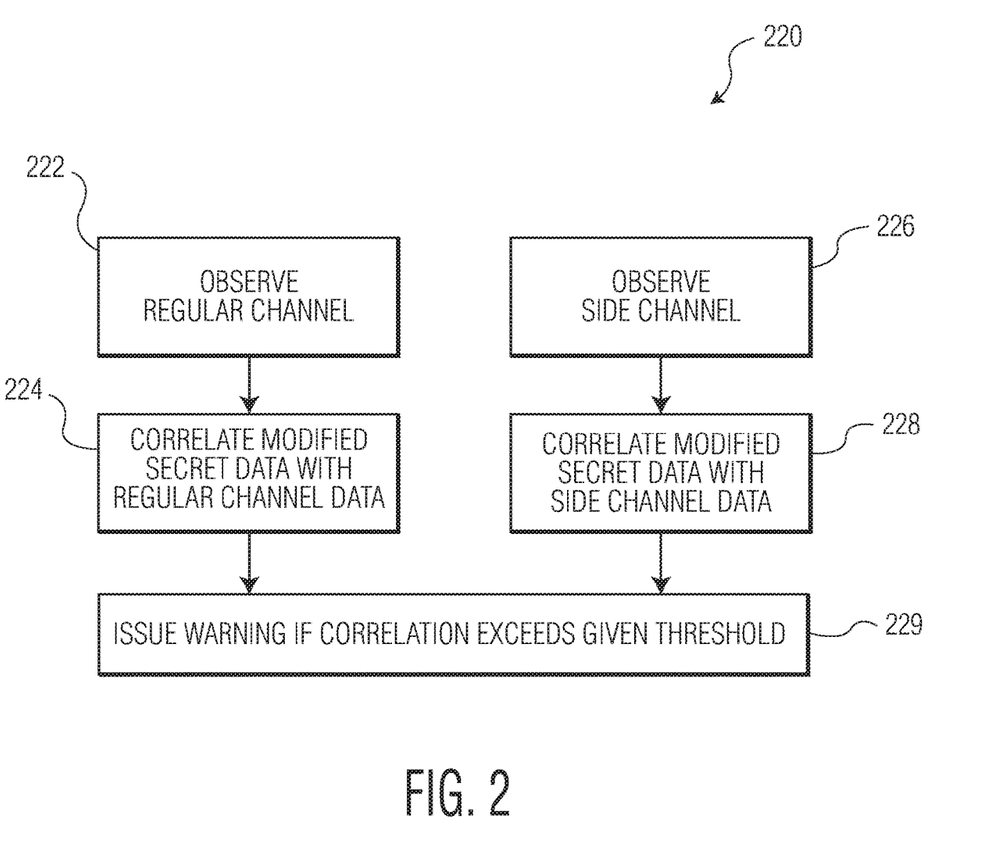
FIG. 2 is a flow chart illustrating an exemplary set of activities and/or data flow for an apparatus of the type implemented in a manner consistent with FIG. 1, in accordance with the present disclosure.

FIG. 2 is a flow chart illustrating an exemplary set of activities and/or data flow for an apparatus of the type implemented in a manner consistent with FIG. 1, in accordance with the present disclosure. The sets of activities 220, for example, are performed by the circuit 110 and include operations associated with the correlation instructions 112 as illustrated by FIG. 1. The correlation instructions include computer executable instructions that when executed cause a processor of a computing apparatus (e.g., the heuristics-operative circuit) to learn behavior of internal circuits under different operating conditions.

The circuit, at 222, observes a regular channel and, at 226, observes a side channel. The observation of the regular channel and side channel may be concurrent and used to learn behavior of internal circuits under different operating conditions. The observation is in response to changing the internal operating conditions, such as changing the supply voltage. Based on the observation and using correlation instructions (and optionally deep learning instructions as further described herein), the heuristics-operative circuit may issue a warning of a suspect HT. For example, the correlation instructions are executed to, at 224, correlate modified SSD with regular channel data (e.g., output channel data), at 228, correlates modified SSD with side channel data, and, in response to the correlation exceeding a threshold, at 229, a warning is issued that a suspect HT is detected.

Figure 3A:
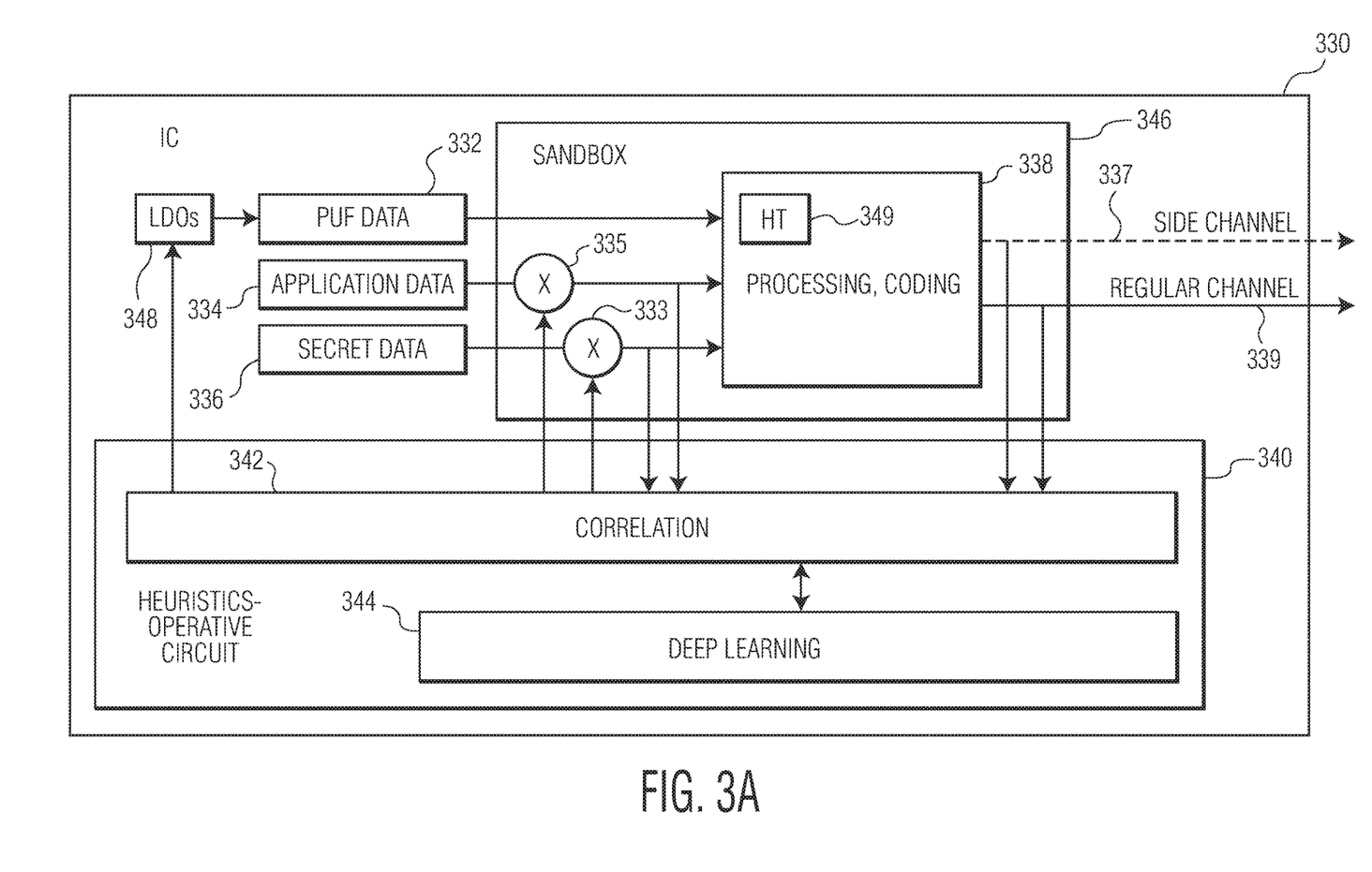
FIGS. 3A-3B illustrate examples of an apparatus including a heuristics-operative circuit, in accordance with the present disclosure.
Figure 3B:
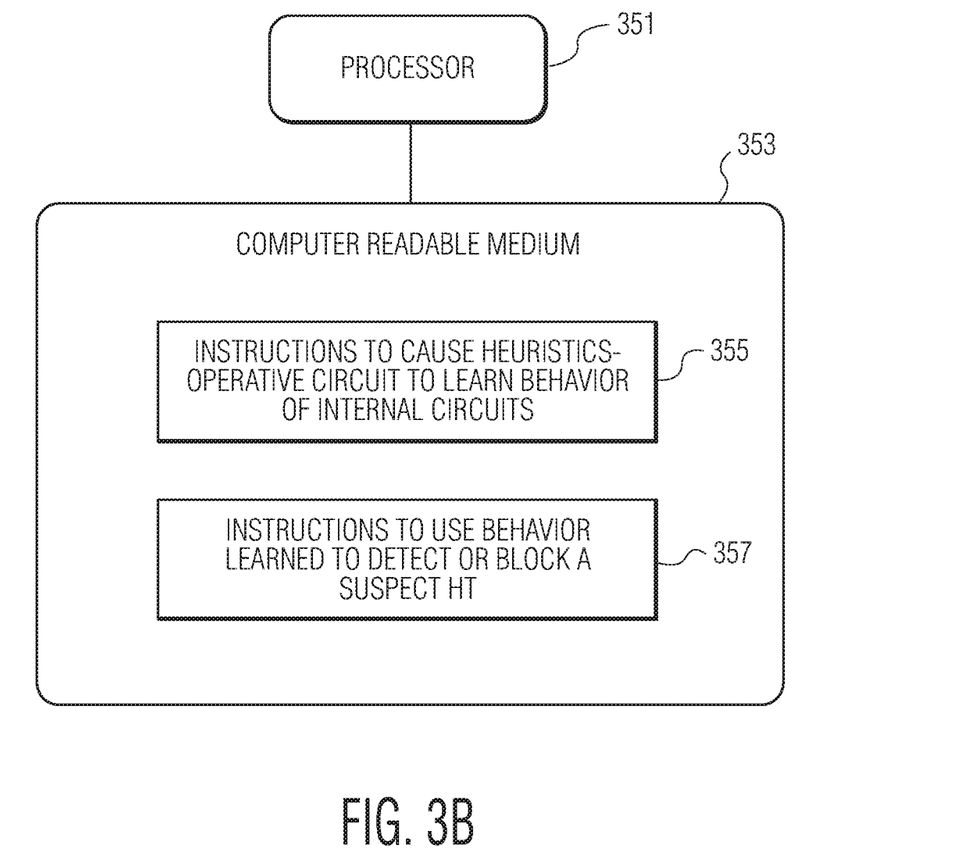

FIGS. 3A-3B illustrate an example apparatus including a heuristics-operative circuit, in accordance with the present disclosure. More specifically, the heuristics-operative circuit illustrated by FIG. 3A may provide one or more altered versions of the SSD 336 and/or application data 334 to the internal circuits to learn the behavior of the internal circuits. By altering the SSD 336 and/or application data 334, a deep learning mechanisms may be used and the altered or modified SSD 336 and/or application data 334 as processed by the internal circuits is placed in a sandbox environment 346 to isolate circuits that process the output data from operating on incorrect or erroneous output data from the internal circuits due to the modification.

The apparatus illustrated by FIG. 3A includes an IC 330 having access ports (e.g., the regular channel 339 and side channel 337) through which information associated with the internal circuits is accessible by the external circuitry associated with the HT 349. The internal circuits provide processing and/or encoding 338 responsive to the input data including the SSD 336, PUF data 332 and/or application data 334 to provide output data via the regular channel 339.

The apparatus further includes the heuristics-operative circuit 340 which learns the behavior of the internal circuits of the IC 330. The learned behavior is unique to the IC 330 under different operating conditions involving the internal circuit, the SSD 336, and other data that is functionally associated with an application of the IC 330, e.g., the application data 334. As previously described, the behavior is learned using the correlation instructions 342 and/or a deep learning instructions 344. In various embodiments, the heuristics-operative circuit 340 includes memory, e.g., medium, and a processor, as further described herein.

By modifying the SSD 336 and/or application data 334, and in some embodiments, the PUF data 332 via the LDOs 348, the heuristics-operative circuit 340 may better learn the behavior of the IC 330 as compared to merely observing the IC 330 under different operating conditions. As previously described, in such embodiments, the heuristics-operative circuit 340 places the processing and/or coding 338 of the internal circuits in the sandbox environment 346 to isolate the modified input data from other circuitry that operates on the output data from the internal circuits. This may prevent false/incorrect output data from corrupting the system in which the IC 330 is operating in.

The deep learning instructions 344 include computer executable instructions that when executed cause a processor of a computing apparatus (e.g., the heuristics-operative circuit 340 of FIG. 4A) to modify the input data. The heuristics-operative circuit 340 executes the deep learning instructions 344 to modify the input data including the SSD 336 and/or the application data 334 using circuitry, such as illustrated by the gate logics 333, 335. By modifying the input data, the heuristics-operative circuit 340 may learn how the regular channel 339 and side channel 338 are impacted or influenced by the application data 334 and the SSD 336. The following are non-limiting examples of how to modify the application data 334 and/or SSD 336. In various embodiments, all bits of the SSD 336 and/or application data 334 are inverted (temporarily) using the deep learning instructions 344. As compression operations in HTs are often linear, the output is also an inverted output signal or signal stream. In other embodiments and/or in addition, all bits of the SSD 336 and/or application data 334 are set to zero or one (temporarily) using the deep learning instructions 344. Compression operations in the HTs then compresses them to a shorter data stream, which is recognizable irrespective of the actual appearance. In specific embodiments, the heuristics-operative circuit 340 uses the deep learning instructions 344 for providing feedback data to modify the SSD 336 and the application data 334, and uses the correlation instructions 342 for correlating the modified SSD 336 and/or application data 334 to output channel data, as described above.

FIG. 3B illustrates an example computing apparatus including non-transitory computer-readable medium storing executable code, in accordance with the present disclosure. The computing apparatus, in accordance with examples herein, includes the heuristics-operative circuit such as the circuit 340 illustrated by FIG. 3A. The computing apparatus is for use with an IC including internal circuits, such as the IC 330 illustrated by FIG. 3A, and including access ports through which information associated with the internal circuits is accessible by external circuitry associated with a HT.

The computing apparatus has a processor 351 and computer readable medium 353 storing a set of instructions 355 and 357. The computer readable medium 353 may, for example, include read-only memory (ROM), random-access memory (RAM), electrically erasable programmable read-only memory (EEPROM), Flash memory, a solid state drive, and/or discrete data register sets. At 355, the computing apparatus may cause a heuristics-operative circuit to learn behavior of the internal circuits. The behavior is unique to the IC under different operating conditions involving the internal circuits, the SSD, and the other data that is functionally associated with an application of the IC. The behavior is learned by observing regular channels of the internal circuits for regular channel data and side channels of the internal circuits for side channel data and correlating SSD or modified SSD with the regular channel data and the side channel data. In some embodiments, the computing apparatus modifies the SSD (and, optionally, the other data) to generate an altered version of the SSD and, in response, observes the regular and side channels of the internal circuits for regular channel data and side channel data. The computing apparatus may further correlate the modified SDD with the regular channel data and side channel data. As may be appreciated, the regular channel data includes output data from the internal circuits responsive to the modified SSD. The side channel data includes information from implementation of the IC, such as power consumption, timing information, and electromagnetic radiation and which may be used to infer information about the SSD as well as the output data and/or input data. As an example, in some instances, side channel data may be used to retrieve a secret key associated with encrypting data.

In specific embodiments, the computing apparatus causes the heuristics-operative circuit to learn behavior of the internal circuits using deep learning instructions (as well as using the above-described correlation instructions), and to determine different thresholds for respective learned behaviors. The deep learning instructions are executed to determine probability distributions (e.g., probability of an HT) of a plurality of different statistic observations. For example, the probability distributions is associated with accesses to external ports and to external memories that are aggregated into histograms of the least significant bit (LSB) and second LSB, time intervals between two accesses to external ports, differences in addresses of memory accesses, and differences in data read and/or written.

At 357, the computing apparatus uses the behavior learned by the heuristics-operative circuit to detect or block a suspect HT, such as blocking the HT from accessing the IC. In some examples, the computing apparatus provides a message or other type of indication in response to the correlation of the modified SSD with the regular channel data and the side channel data exceeding a threshold. The message is indicative of the detection of the suspect HT attempting to transmit information. The modified SSD may be responsive to the alteration by the heuristics-operative circuit and/or based on different operating conditions. The computing device further provides a sandbox environment for the internal circuits and associated processing by providing the modified SSD, observing the output data in response, and isolating circuitry that processes the output data from the modified (e.g., incorrect) output data. The modified output data is the output by the internal circuits responsive to processing the modified SSD. In some specific embodiments, the computer apparatus further varies a supply voltage (to modify possible PUF-values) in response to detecting the suspect HT and assesses the resulting effect on the suspect HT.

Figure 4A:
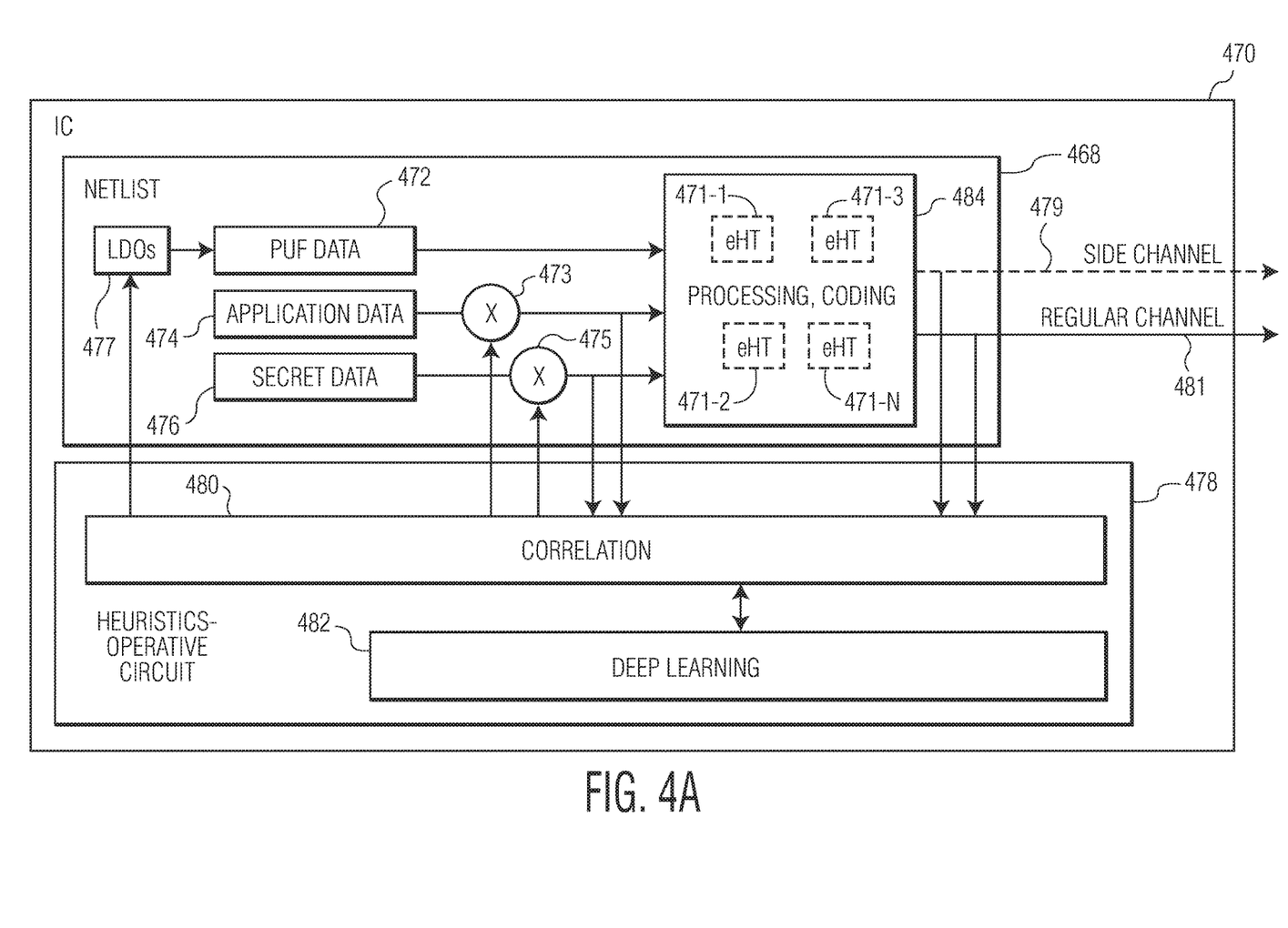
FIGS. 4A-4B illustrate an example apparatus including a heuristics-operative circuit and exemplary set of activities and/or data flow for the apparatus, in accordance with the present disclosure.
Figure 4B:
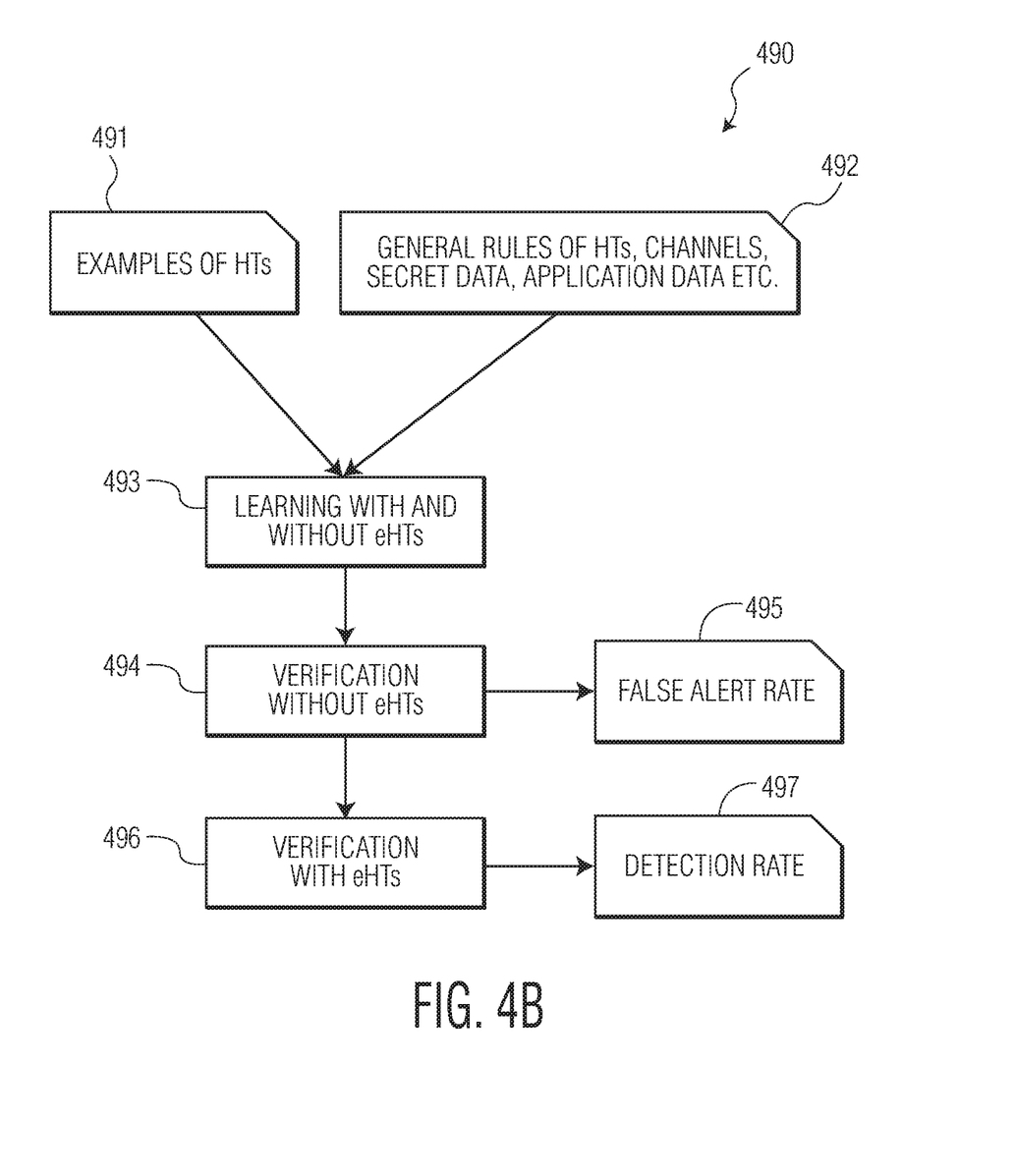

FIGS. 4A-4B illustrate an example apparatus including a heuristics-operative circuit and exemplary set of activities and/or data flow for the apparatus, in accordance with the present disclosure.

More specifically, FIG. 4A illustrates an apparatus that learns the internal behavior based on modifying input data and emulating HTs using a heuristics-operative circuit 478. The apparatus includes an IC 470 having access ports (e.g., a regular channel 481 and side channel 479) through which information associated with the internal circuits is accessible by the external circuitry associated with an HT. The internal circuits provide processing and/or encoding 484 responsive to the input data including the SSD 476, PUF data 472 and/or application data 474 to provide output data via a regular channel 481.

The heuristics-operative circuit 478 observes the regular channel 481 and side channel 479 responsive to different operating conditions, such as different supply voltages which are adjusted using the LDOs 477 as previously described. The heuristics-operative circuit 478 illustrated by FIG. 4 may provide one or more altered versions of the SSD 476 and/or application data 474 to the internal circuits, such as via the logic gates 473, 475, for processing and coding 484 and to learn the behavior of the internal circuits using correlation instructions 480 and deep learning instructions 482. The processing and/or coding 484 of the internal circuits is placed in a sandbox environment to isolate circuits from operating on output data from the internal circuits that is incorrect due to the modification of the input data, as previously described.

The deep learning instructions 482 are used to identify correlation in an unsupervised self-learning mode, such as illustrated by the apparatus of FIG. 3A. During a self-learning mode, a large amount of data is used to detect if an HT is transmitting information. For example, to determine if a HT is detected that is leaking information, many different leaking and non-leaking runs of the different operating conditions and/or modified input data are performed. The number of runs is reduced by the apparatus illustrated by FIG. 4A, as compared to the apparatus of FIG. 3A, by using the deep learning instructions 482 and information related to typical leaking conditions (e.g., routines where SSD 476 are processed), typical non-leaking conditions (e.g., right after start-up so that a delayed-triggered HT is inactive), suspected or plausible modification of regular channels 481 caused by HTs, suspected or plausible modification of side channels 479 caused by HTs, and general statistic properties known about the regular channels 481 and side channels 479. The information may be used to emulate HTs 471-1, 471-2, 471-3, 471-N and place the emulated HTs 471-1, 471-2, 471-3, 471-N at different locations of the IC 470.

The learning procedure may be performed, which may be off-line, by simulating a netlist 468 of the IC 470, with the different emulated HTs 471-1, 471-2, 471-3, 471-N at different locations of the IC 470 applied sequentially in different runs of the deep learning instructions 482 and by performing a verification process. The deep learning instructions 482 are used to evaluate the responses of the simulated netlist 468 including the different emulated HTs 471-1, 471-2, 471-3, 471-N.

FIG. 4B illustrates and example flow chart 490 of setting up emulated HTs, such as the emulated HTs 471-1, 471-2, 471-3, 471-N illustrated by FIG. 4A. The emulated HTs may have the following properties: behavior switching from inactive to active to mimic triggering of HTs, behavior of modifying regular channels and side channels, placed at different locations of the IC to access different input nodes and output nodes of the circuit, and different operations of modifying regular and side channels. At shown, at 491 and 492, information indicative of different HTs and general rules of HTs, channels, SSD, and application data is input to emulate HTs. Using this information, at 493, the heuristics-operative circuit learns internal behavior with and without the emulated HTs. At 494, the heuristics-operative circuit performs a verification processes without the emulated HTs to provide a false alert rate, at 495. At 496, the heuristics-operative circuit performs the verification process with the emulated HTs to provide a detection rate, at 497.

The deep learning instructions are executed to learn the behavior and/or provide feedback, such as for providing feedback data to modify the SSD and other data that is functionally associated with an application of the IC. A number of rules, such as illustrated at 492, may be implemented by or used with the deep learning instructions to generate probability distributions, such as histograms, indicative of the probability of a suspect HT (e.g., a degree of confidence) and for determining the respective thresholds or rates. The deep learning instructions may be used to perform pre-processing/data reduction of the amount of data (e.g. identifying constant values, identifying constantly changing values) into the probability distributions. For example, accesses to external ports and/or to external memories like RAMs may be aggregated into a first histogram showing the time interval between two accesses, a second histogram showing the difference in addresses of memories that are accessed, and third histogram showing the difference of data written or read, among other histograms such as histograms of the LSB and second LSB. The deep learning instructions may be used to perform feature extraction. For example, such feature extraction may focus on a non-linear behavior, e.g., a HT may react to small or big changes of the secret data in the same way—it notices that the SSD has changed, and tries to leak it, such as after encoding the SSD. Without an active HT, the device may not react to the change of the SSD at all, or, if it reacts, the reaction for small modification of the SDD may be different than the reaction to big modifications.

Verification, such as at 494 and 496, is performed on a number of data sets applied on, such as a netlist 468 without emulated HTs, to assess and adjust the false alert rate. Additionally, the verification is performed on a number of data sets applied on netlist 468 with the emulated HTs, which are different emulated HTs to those that are used during training, such as at 493, and placed at different locations in the netlist 468, to assess the detection rate. Many different HTs are known and expressly, with the total publically available HT models estimated to exceed over 1,000.

The false alert rate and detection rate, at 495 and 497, are set or otherwise adjusted. As the result of behavior analysis is not a hard "true/false" decision of detected HT behavior, but is a likelihood of HT behavior, the detection threshold may be adjusted so that the false alert rate is acceptable. With this adjusted threshold, the detection rate is assessed.

Figure 5A:
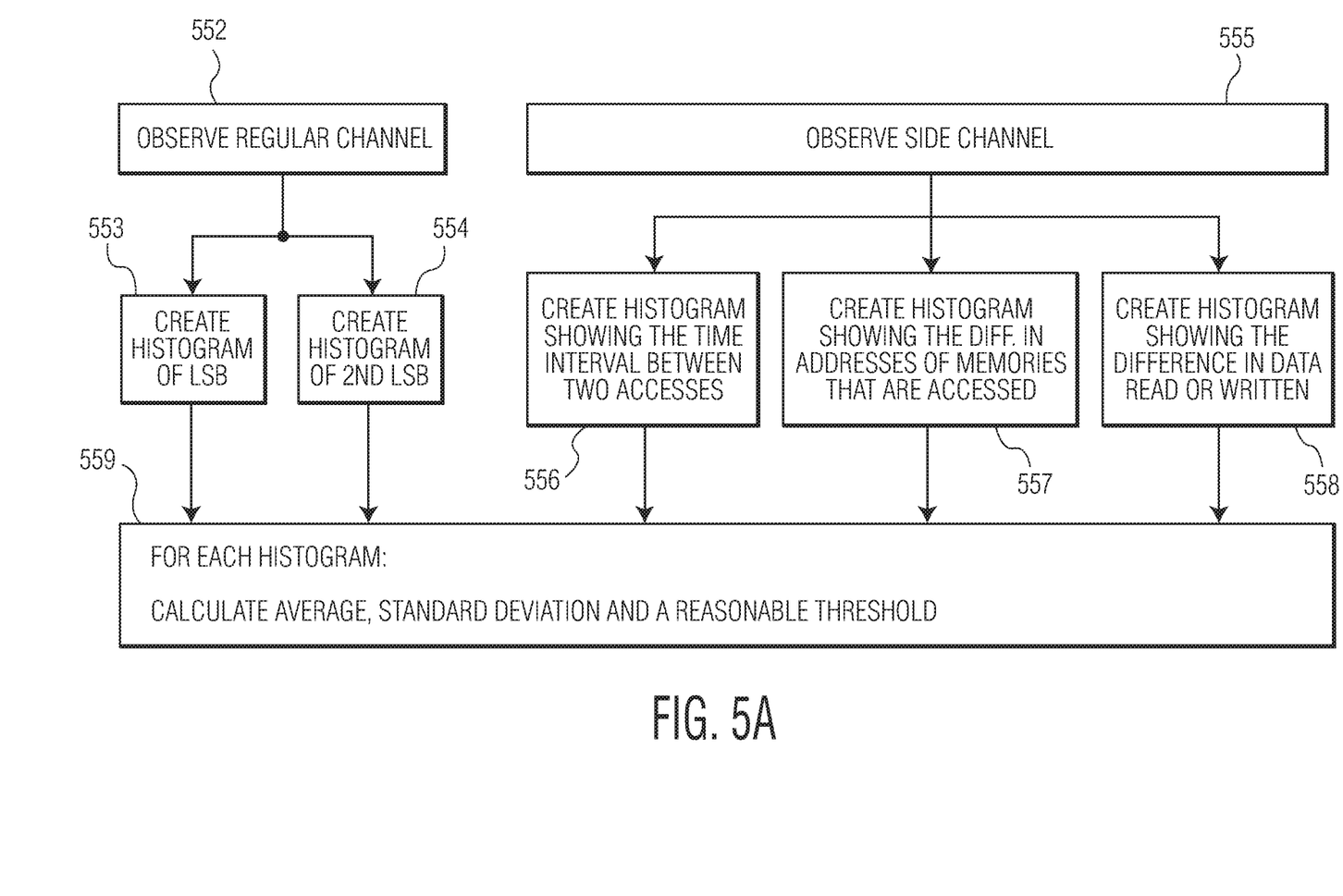
FIGS. 5A-5B are flow charts illustrating exemplary sets of activities and/or data flow for an apparatus of the type implemented in a manner consistent with FIGS. 3 and 4A, in accordance with the present disclosure.
Figure 5B:
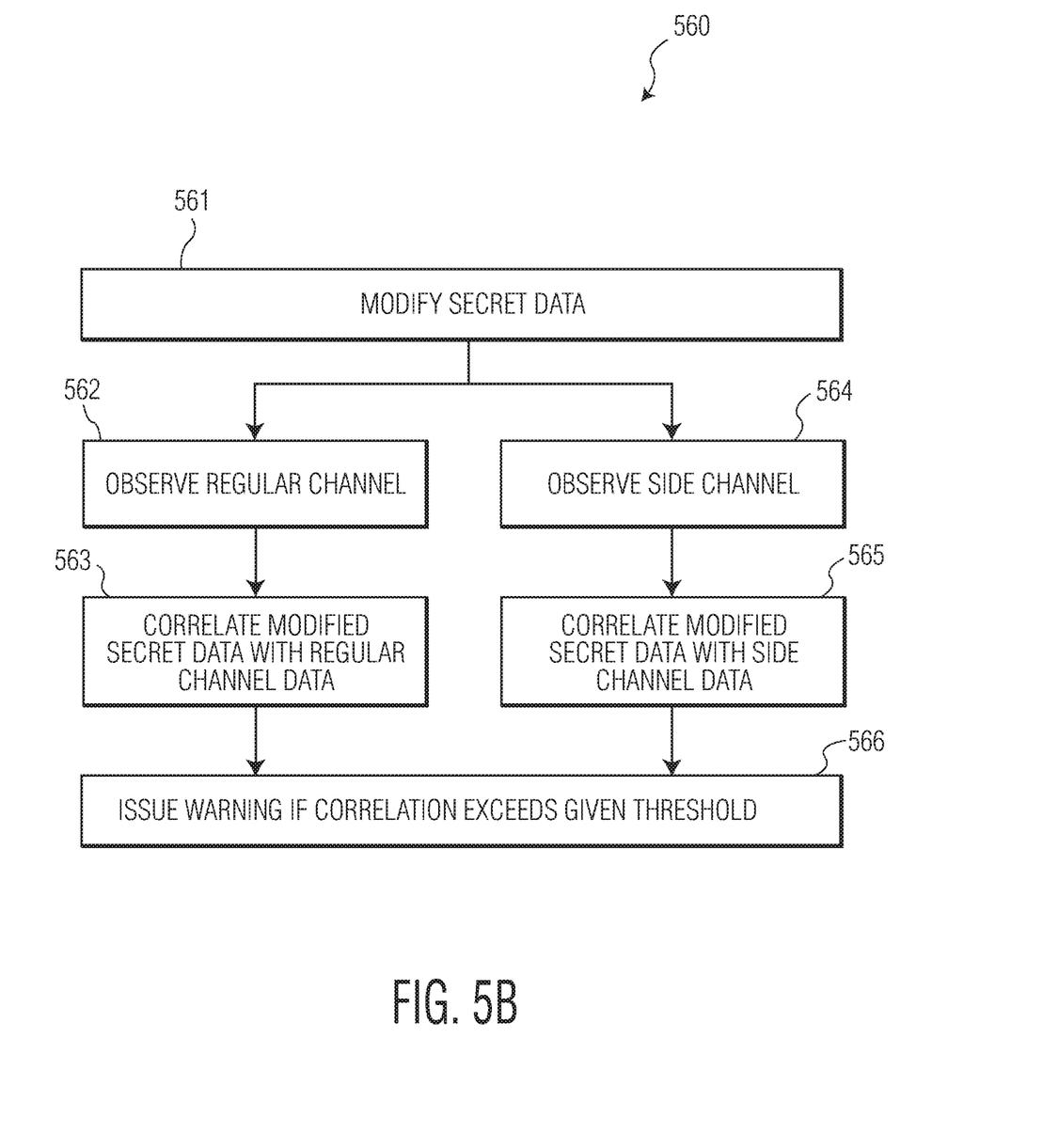

FIGS. 5A-5B are flow charts illustrating exemplary sets of activities and/or data flow for an apparatus of the type implemented in a manner consistent with FIG. 3A and FIG. 4A, in accordance with the present disclosure.

More specifically, FIG. 5A illustrates an example method of learning behavior of internal circuits of an IC based on observation. As shown, regular and side channels are observed, at 552 and 555, responsive to different operating conditions and/or modified input data. In response to the observation, the deep learning instructions, such as described above, are executed to generate probability distributions, such as histograms, indicative of the probability of a suspect HT. The regular channel observations (e.g., regular channel data) are used to create a histogram of the LSB, at 553, and create a histogram of the second LSB, at 554. The side channel observations (e.g., side channel data) are used to create a histogram showing the time interval between two accesses, at 556, create a histogram showing the difference in address of memories that are accessed, at 557, and create a histogram showing the differences in data read or written, at 558. At 559, for each of the created histograms, an average, a standard deviation, and reasonable threshold is calculated and used to determine the thresholds. The observations, at 552 and 555, may be responsive to modifying the SSD or other input data (or responsive to not modifying input data) in various specific embodiments.

FIG. 5B illustrates and example method 560 of detection of a HT based on modification. The method 560 includes, at 561, modifying the SSD. In response to the modification, the regular channels are observed, at 562, and the side channels are observed, at 564. Based on the observation, at 563, the modified SSD is correlated with the regular channel data, and, at 565, the modified SSD is correlated with the side channel data. The correlations are compared to given threshold(s) and, at 566, a warning is issued in response to a correlation exceeding a given threshold.

Figure 6:
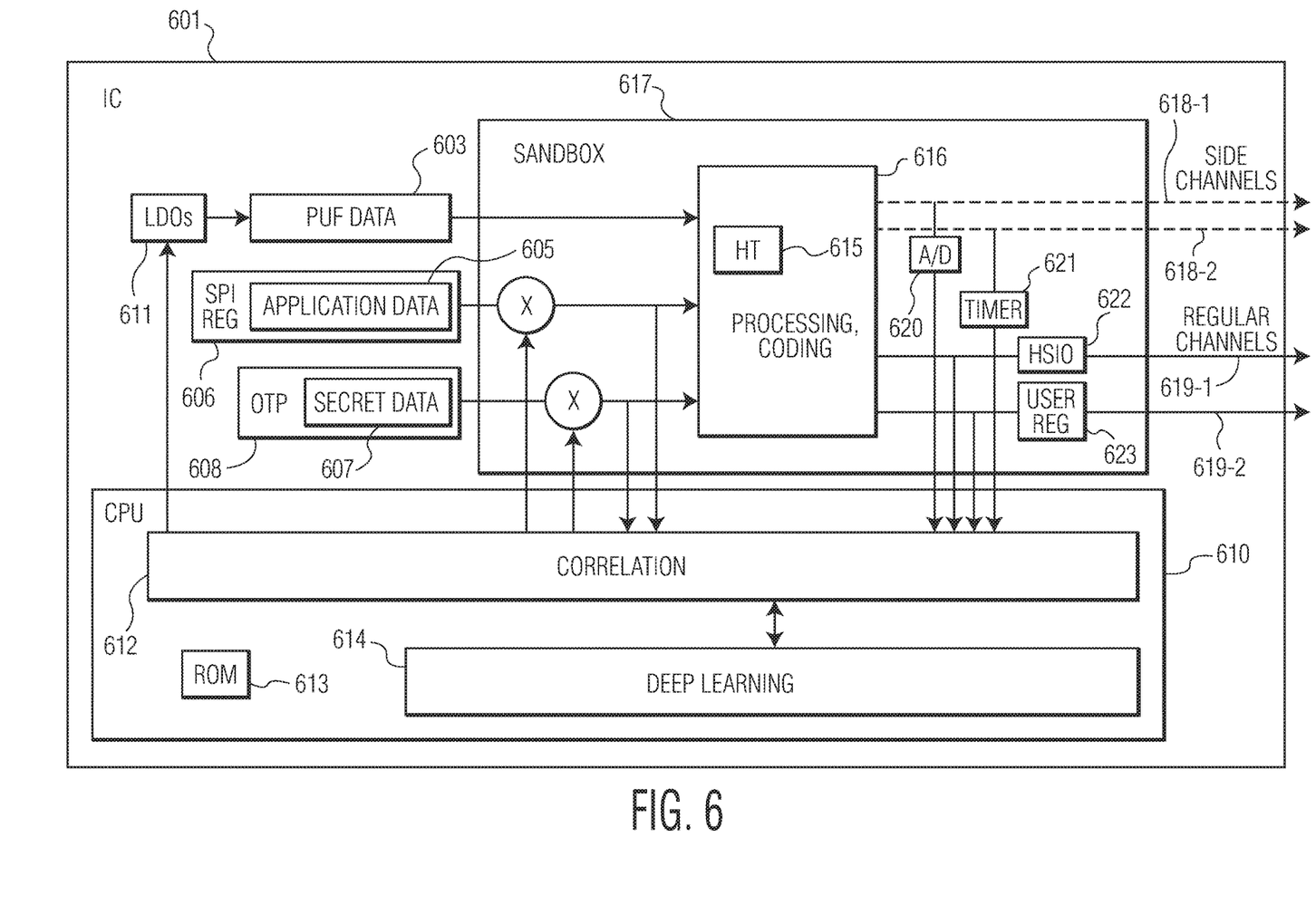
FIG. 6 is an example apparatus including a heuristics-operative circuit, in accordance with the present disclosure.

FIG. 6 is an example apparatus including a heuristics-operative circuit, in accordance with the present disclosure. More specifically, FIG. 6 is an example implementation of an IC 601 that learns the internal behavior of internal circuits based on modifying input data and emulating HTs using a heuristics-operative circuit, which may include or form part of the central processing unit (CPU) 610. The apparatus includes an IC 601 having access ports (e.g., the regular channels 619-1, 619-2 and side channels 618-1, 618-2) through which information associated with the internal circuits is accessible by the external circuitry associated with an HT. The internal circuits provide processing and/or coding 616 responsive to the input data including the SSD 607, PUF data 603 and/or application data 605 to provide output data via the regular channels 619-1, 619-2.

The heuristics-operative circuit, which may include or form part of the CPU 610, observes the regular channels 619-1, 619-2 and side channels 618-1, 618-2 responsive to the different operating conditions. The heuristics-operative circuit may provide one or more altered versions of the SSD 607, application data 605, and the PUF data 603 to the internal circuits, such as via the logic gates, for processing and coding 616 to learn the behavior of the internal circuits using the correlation instructions 612 (e.g., as described above, for example, in connection with FIG. 2) and the deep learning instructions 614 (e.g., as described above, for example, in connection with FIGS. 4A-4B). For example, the correlation instructions 612 are executed to access input data, which may or may not be modified, to access output data (e.g., channel data) that is responsive to the input data, to correlate the input data with the output data, and optionally, to issue a warning. The deep learning instructions 614 are executed to modify input data, to learn behavior of the IC based on a plurality of input data (including the modified input data), system settings, and possible HT models for detecting HTs (e.g., creation of different histograms used to learn the behavior and determine thresholds for the respective behaviors), and to, optionally, provide feedback data based on the learned behavior, such as further modifications to the input data. As shown, the processing and/or coding 616 of the internal circuits is placed in a sandbox environment 617 to isolate circuits from operating on output data from the internal circuits that is incorrect due to the modification of the input data.

Each of the various example hardware components of the IC are dependent on the specific IC. The IC 601 illustrates some example specific implementations. In the embodiment illustrated by FIG. 6, the modification of SSD 607 and application data 605 (as described above), the correlation, the sandbox environment 617 and HT detection is run on the internal CPU 610, intermittent to the application mode. The details of the HT detection, acquired by the deep learning instructions 614, may be stored on-chip in the ROM 613 of the CPU 610. The PUF data 603 may include the power-on values of memories, or the frequencies of different ring oscillators, or initial states of flip-flops, each being unique (or nearly unique) for each IC and each being supplied by a power supply that is regulated via an internal LDO 611 that is adjustable via a user register that is also accessible by the internal CPU 610. The application data 605 may be provided by registers 606, e.g., programmable externally via SPI and also accessible by the internal CPU 610. The SSD 607, e.g., private keys for data encryption, may be stored in an OTP 608 that is programmed during production test.

The side channels 618-1, 618-2 may include the timing of I/O channels (e.g., measured with high resolution by a dedicated timer circuit 621) and/or the headers of data packets transmitted via regular I/O channels. The side channels 618-1, 618-2 may also and/or alternatively include analog values like the supply current that might be modulated by a HT 615 in order to leak information; in this case, the analog value may be digitized by a dedicated analog-to-digital converter 620. The regular channels 619-1, 619-2 may include the data transfer sent via HSIO interfaces 622 to other ICs or to a common data bus. They may also include the access to user registers 623, e.g., via SPI.

The various apparatuses described above may be used for on-line detection of data leaking, using the following combination of measures that may be combined synergistically. The measures include statistic based evaluation of correlation properties for detecting steganography leaking of SSD based on statistics of the LSB and the second LSB, observation of the SSD and application data and correlation to output data, modification of the SSD and/or application data, and correlation to output data with processing done in a sandbox environment. The measures further include varying the supply voltage to modify possible PUF-values and assessing the resulting effect on a suspect HT and assessment of statistic properties and irregularities based on deep learning techniques.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, unit, controller, and/or other circuit-type depictions (e.g., reference numerals 108 and 346 of FIGS. 1 and 3A depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out as described in connection with FIG. 3B and/or FIG. 5B. In certain embodiments, such a programmable circuit is one or more computer circuits, including memory circuitry for storing and accessing a program to be executed as a set (or sets) of instructions (and/or to be used as configuration data to define how the programmable circuit is to perform), and an operation or process as described herein is used by the programmable circuit to perform the related steps, functions, operations, activities, etc. Depending on the application, the instructions (and/or configuration data) may be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the apparatus illustrated by FIG. 1 may include the circuit 601 illustrated by FIG. 6. Similarly, the apparatus illustrated by FIG. 3A may be used to implement the various processing illustrated herein, such as those illustrated by FIG. 2 Such modifications do not depart from the true scope of various aspects of the disclosure, including aspects set forth in the claims.

What is claimed is:

1. An apparatus comprising:
   integrated circuitry including internal circuits having sensitive/secret data (SSD) to be maintained as confidential relative to a suspect Hardware Trojan (HT) and including access ports through which information associated with the internal circuits is accessible by external circuitry associated with the HT; and
   a further circuit to learn behavior of the internal circuits that is unique to the integrated circuitry under different operating conditions involving the internal circuits, involving the SSD and involving other data that is functionally associated with an application of the integrated circuitry;
   wherein the different operating conditions include accessing the internal circuits using one or more altered versions of the SSD.

2. The apparatus of claim 1, wherein the further circuit is a heuristics-operative circuit and the behavior of the internal circuits is learned by the heuristics-operative circuit by observing regular channels of the internal circuits and side channels of the internal circuits.

3. The apparatus of claim 1, further including a learning-center memory at which the further circuit stores data from which the learned behavior of the internal circuits is developed and correlation instructions.

4. The apparatus of claim 1, the further circuit includes a learning-center memory and correlation instructions to develop the learned behavior of the internal circuits, and to assess and correlate statistics involving operation of the internal circuits under different operating conditions.

5. The apparatus of claim 1, wherein the further circuit is to detect the suspect HT attempting to transmit information via the ports.

6. The apparatus of claim 1, wherein the further circuit is to detect the suspect HT attempting to transmit information via the ports associated with manipulation of timing for access of memory.

7. The apparatus of claim 1, wherein the further circuit is to detect the suspect HT attempting to transmit information from the integrated circuitry via the internal circuits.

8. An apparatus comprising:
   integrated circuitry including internal circuits having sensitive/secret data (SSD) to be maintained as confidential relative to a suspect Hardware Trojan (HT) and including access ports through which information associated with the internal circuits is accessible by external circuitry associated with the HT; and
   a further circuit to learn behavior of the internal circuits that is unique to the integrated circuitry under different operating conditions involving the internal circuits, involving the SSD and involving other data that is functionally associated with an application of the integrated circuitry, the further circuit includes a learning-center memory and correlation instructions to develop the learned behavior of the internal circuits, and to assess and correlate statistics involving operation of the internal circuits under different operating conditions, wherein the further circuit is to use deep learning instructions for providing feedback data to modify the SSD and the other data that is functionally associated with the application of the integrated circuitry.

9. An apparatus comprising:
   integrated circuitry including internal circuits having sensitive/secret data (SSD) to be maintained as confidential relative to a suspect Hardware Trojan (HT) and including access ports through which information associated with the internal circuits is accessible by external circuitry associated with the HT; and
   a further circuit to learn behavior of the internal circuits that is unique to the integrated circuitry under different operating conditions involving the internal circuits, involving the SSD and involving other data that is functionally associated with an application of the integrated circuitry;
   wherein the further circuit is to determine probability distributions of:
     least significant bits (LSB) and second LSB;
     time intervals between two access to external ports;
     differences in addresses of memory accesses; and
     difference in data read or written.

10. An apparatus comprising:
   integrated circuitry including internal circuits having sensitive/secret data (SSD) to be maintained as confidential relative to a suspect Hardware Trojan (HT) and including access ports through which information associated with the internal circuits is accessible by external circuitry associated with the HT; and
   a further circuit to learn behavior of the internal circuits that is unique to the integrated circuitry under different operating conditions involving the internal circuits, involving the SSD and involving other data that is functionally associated with an application of the integrated circuitry;
   a learning-center memory at which the further circuit stores data from which the learned behavior of the internal circuits is developed by changing or adapting logical operations used to trigger monitoring or recordation events based on a statistic property or an irregularity associated with the internal circuits.

11. The apparatus of claim 10, wherein the different operating conditions include accessing the internal circuits using one or more altered versions of the SSD.

12. For use in integrated circuitry including internal circuits having sensitive/secret data (SSD) and including access ports through information associated with the internal circuits is accessible by external circuitry associated with a Hardware Trojan (HT), a non-transitory computer-readable storage medium comprising instructions that when executed cause a processor of a computing apparatus to:
   cause a heuristics-operative circuit to learn behavior of the internal circuits, the behavior being unique to the integrated circuitry under different operating conditions involving: the internal circuits, the SSD, and other data that is functionally associated with an application of the integrated circuitry; and
   use the behavior learned by the heuristics-operative circuit to detect or block a suspect HT from accessing the integrated circuitry;
   wherein the instructions are executable to further cause the processor to isolate modified SSD and resulting regular channel data from circuitry of the computing apparatus that operates on the regular channel data.

13. The non-transitory computer-readable storage medium of claim 12, wherein the instructions are executed to further cause the processor to:
   observe regular channels of the internal circuits for regular channel data and side channels of the internal circuits for side channel data;
   correlate modified SSD with the regular channel data and the side channel data; and
   provide message in response to the correlation exceeding a threshold.

14. The non-transitory computer-readable storage medium of claim 12, wherein the instructions are executed to further cause the processor to modify the SSD and other data and, in response, observe regular channels of the internal circuits for regular channel data and side channels of the internal circuits for side channel data.

15. The non-transitory computer-readable storage medium of claim 12, wherein the instructions are executed to further cause the processor to:
   correlate modified SSD and other data with regular channel data and side channel data; and
   in response to correlation exceeding a threshold, provide an indication of detection of a suspect HT attempting to transmit information.

16. The non-transitory computer-readable storage medium of claim 12, wherein the instructions are executed to further cause the processor to:
   observe SSD with regular channel data and side channel data;
   correlate modified SSD with regular channel data and side channel data; and
   in response to correlation exceeding a threshold, provide an indication of detection of a suspect HT attempting to transmit information.

17. The non-transitory computer-readable storage medium of claim 12, wherein the instructions to cause the heuristics-operative circuit to learn behavior of the internal circuits are executed to further cause the processor to:
   observe SSD with regular channel data and side channel data;
   cause the heuristics-operative circuit to learn behavior of the internal circuits using deep learning instructions; and
   determine thresholds for respective learned behaviors.

18. For use in integrated circuitry including internal circuits having sensitive/secret data (SSD) and including access ports through information associated with the internal circuits is accessible by external circuitry associated with a Hardware Trojan (HT), a non-transitory computer-readable storage medium comprising instructions that when executed cause a processor of a computing apparatus to:
   cause a heuristics-operative circuit to learn behavior of the internal circuits, the behavior being unique to the integrated circuitry under different operating conditions involving: the internal circuits, the SSD, and other data that is functionally associated with an application of the integrated circuitry; and
   use the behavior learned by the heuristics-operative circuit to detect or block a suspect HT from accessing the integrated circuitry;
   wherein the instructions to cause the heuristics-operative circuit to learn behavior of the internal circuits are executed to further cause the processor to:
      observe SSD with regular channel data and side channel data;
      cause the heuristics-operative circuit to learn behavior of the internal circuits using deep learning instructions; and
      determine thresholds for respective learned behaviors.

19. The non-transitory computer-readable storage medium of claim 18, wherein the instructions to cause the heuristics-operative circuit to learn behavior of the internal circuits are executed to further cause the processor to determine probability distributions of:
   least significant bits (LSB) and second LSB;
   time intervals between two access to external ports;
   differences in addresses of memory accesses; and
   difference in data read or written.

20. The non-transitory computer-readable storage medium of claim 18, wherein the instructions are executed to further cause the processor to vary a supply voltage in response to detecting the suspect HT and assessing a resulting effect on the suspect HT.

* * * * *